(12) United States Patent
Baker

(10) Patent No.: US 9,617,082 B2
(45) Date of Patent: Apr. 11, 2017

(54) CONTAINER STORAGE AND RETRIEVAL SYSTEM AND METHOD

(75) Inventor: John Russell Baker, Mangere Bridge (NZ)

(73) Assignee: Sodium Limited, Auckland (NZ)

( * ) Notice: Subject to any disclaimer, the term of this patent is extended or adjusted under 35 U.S.C. 154(b) by 0 days.

(21) Appl. No.: 13/394,033

(22) PCT Filed: Sep. 3, 2010

(86) PCT No.: PCT/NZ2010/000175
§ 371 (c)(1),
(2), (4) Date: May 14, 2012

(87) PCT Pub. No.: WO2011/028136
PCT Pub. Date: Mar. 10, 2011

(65) Prior Publication Data
US 2012/0219397 A1    Aug. 30, 2012

(30) Foreign Application Priority Data

Sep. 4, 2009 (AU) ................................ 2009904222

(51) Int. Cl.
*B65G 59/00* (2006.01)
*B65G 57/00* (2006.01)
(Continued)

(52) U.S. Cl.
CPC ....... *B65G 47/5104* (2013.01); *B65G 1/1373* (2013.01); *B65G 57/00* (2013.01)

(58) Field of Classification Search
CPC . B65H 1/263; B65H 1/30; B65G 1/04; B65G 1/047; B65G 1/137; B65G 1/14;
(Continued)

(56) References Cited

U.S. PATENT DOCUMENTS

| 4,850,783 A * | 7/1989 | Maekawa ................. 414/792.9 |
| 5,000,643 A * | 3/1991 | Tanaka et al. ............... 414/267 |

(Continued)

FOREIGN PATENT DOCUMENTS

| EP | 0 767 113 | 7/2002 |
| FI | 101063 | 4/1998 |

(Continued)

OTHER PUBLICATIONS

International Search Report for International Application No. PCT/NZ2010/000175 mailed Jan. 12, 2011.
(Continued)

*Primary Examiner* — Michael McCullough
*Assistant Examiner* — Lynn Schwenning
(74) *Attorney, Agent, or Firm* — Merchant & Gould P.C.

(57) ABSTRACT

A system for storing and retrieving containers (108) comprises a first conveying means (1) operable to move stacks of containers between a loading position (2) and a discharge position (4), a container store (5), a container store dispatch conveyor (28) and a container store delivery conveyor (26). A first transfer means transfers containers from the container store dispatch conveyor (28) to the first conveying means (1) and a second transfer means transfers containers from the first conveying means (1) to the container store delivery conveyor (26). A container store storage/retrieval means (9) moves containers from the container store (5) to the container store dispatch conveyor (28) and from the container store delivery conveyor (26) to the container store (5). The system has stack destacking means (30) which are capable of destacking full stacks into at least two partial stacks, the stack destacking means positioned to allow containers which have passed through the destacking means to be delivered to the container store (5) by the container store delivery conveyor (26).

21 Claims, 13 Drawing Sheets

(51) Int. Cl.
*B65G 47/51* (2006.01)
*B65G 1/137* (2006.01)

(58) Field of Classification Search
CPC ........ B65G 9/004; B65G 57/03; B65G 59/02; B65G 65/02; B65G 1/0435; B65G 1/1378; B65G 61/00; B65G 47/52
USPC ............................. 414/795.8, 278, 285, 799; 198/347.1–347.4
See application file for complete search history.

(56) References Cited

U.S. PATENT DOCUMENTS

| | | | |
|---|---|---|---|
| 5,363,310 A * | 11/1994 | Haj-Ali-Ahmadi et al. | 700/216 |
| 5,636,966 A | 6/1997 | Lyon et al. | |
| 5,664,928 A * | 9/1997 | Stauber | 414/269 |
| 5,669,748 A * | 9/1997 | Knudsen, Jr. | 414/273 |
| 5,953,234 A * | 9/1999 | Singer et al. | 700/214 |
| 6,061,607 A | 5/2000 | Bradley et al. | |
| 6,139,240 A * | 10/2000 | Ando | 414/267 |
| 6,321,138 B1 * | 11/2001 | Livesay et al. | 700/245 |
| 6,609,605 B1 * | 8/2003 | Linder | 198/347.1 |
| 6,799,671 B1 * | 10/2004 | Sanchez Gomez | 198/349.5 |
| 2001/0038784 A1 | 11/2001 | Peltomaki | |
| 2002/0021954 A1 * | 2/2002 | Winkler | 414/273 |
| 2004/0071539 A1 * | 4/2004 | Anater et al. | 414/793.2 |
| 2004/0193311 A1 * | 9/2004 | Winkler | 700/216 |
| 2005/0220600 A1 | 10/2005 | Baker et al. | |
| 2006/0045727 A1 * | 3/2006 | Jungbluth | B65G 1/1375 414/800 |
| 2006/0073002 A1 * | 4/2006 | Koide | B65G 1/0421 414/640 |
| 2008/0199297 A1 | 8/2008 | Grunbach et al. | |
| 2011/0058926 A1 * | 3/2011 | Winkler | 414/795.4 |
| 2011/0106295 A1 * | 5/2011 | Miranda et al. | 700/216 |

FOREIGN PATENT DOCUMENTS

| | | |
|---|---|---|
| WO | WO 02/059021 | 8/2002 |
| WO | WO 03/095339 | 11/2003 |

OTHER PUBLICATIONS

International Search Report for International Application No. PCT/NZ2014/000187 mailed Dec. 10, 2014 (6 pages).

International Written Opinion for International Application No. PCT/NZ2014/000187 mailed Dec. 10, 2014 (8 pages).

International Preliminary Report on Patentability for International Application No. PCT/NZ2014/000187 mailed Dec. 23, 2014 (10 pages).

* cited by examiner

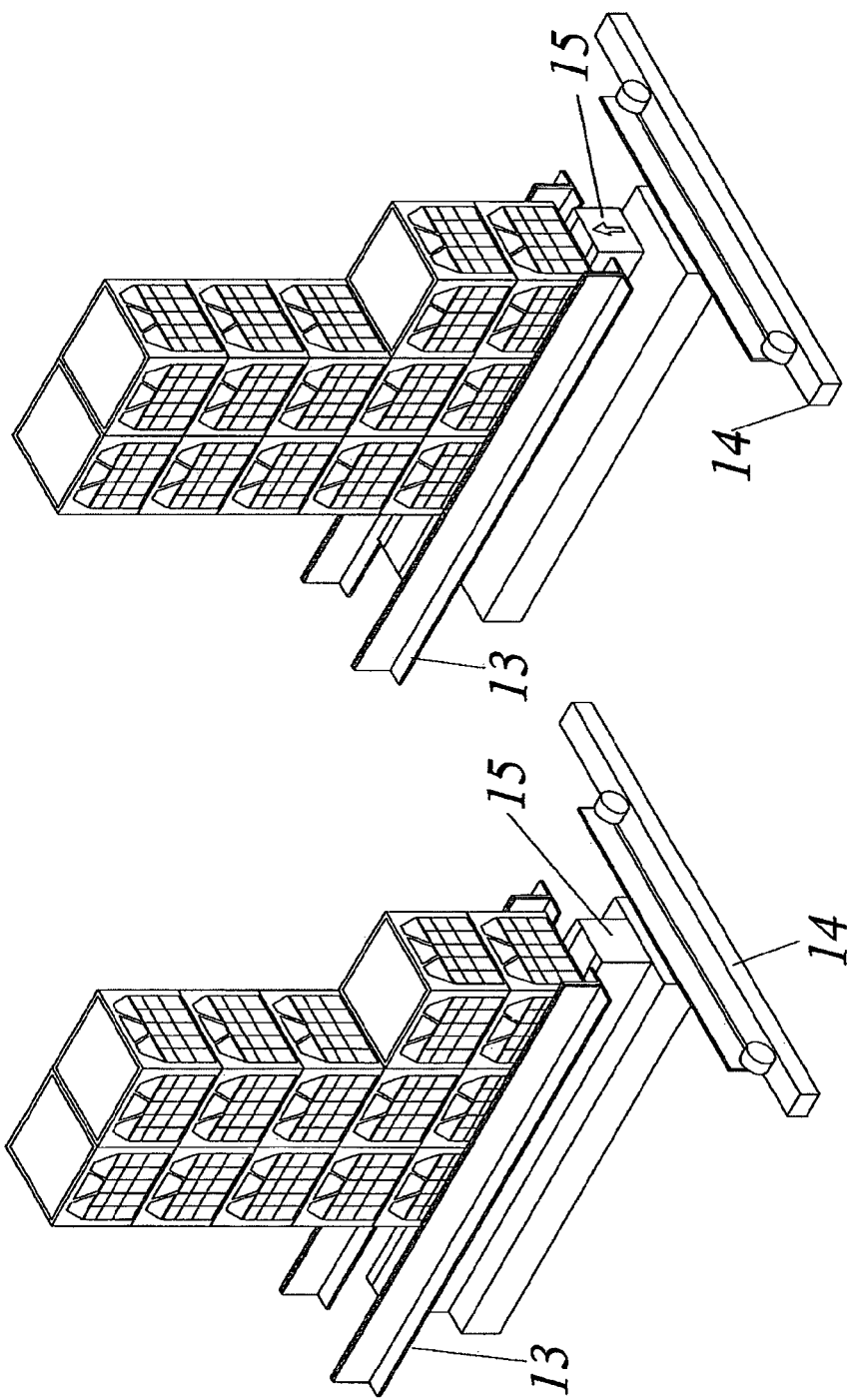

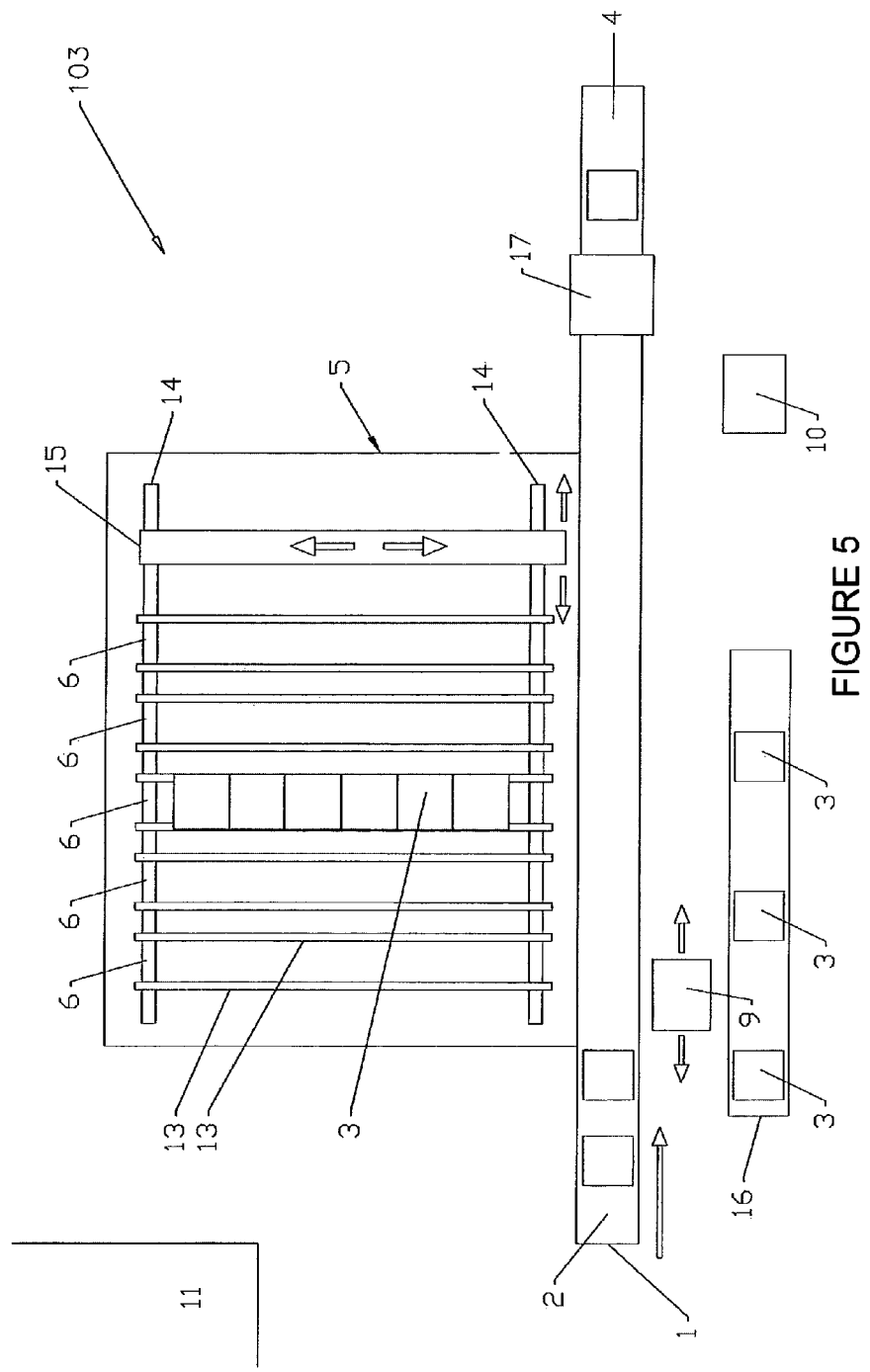

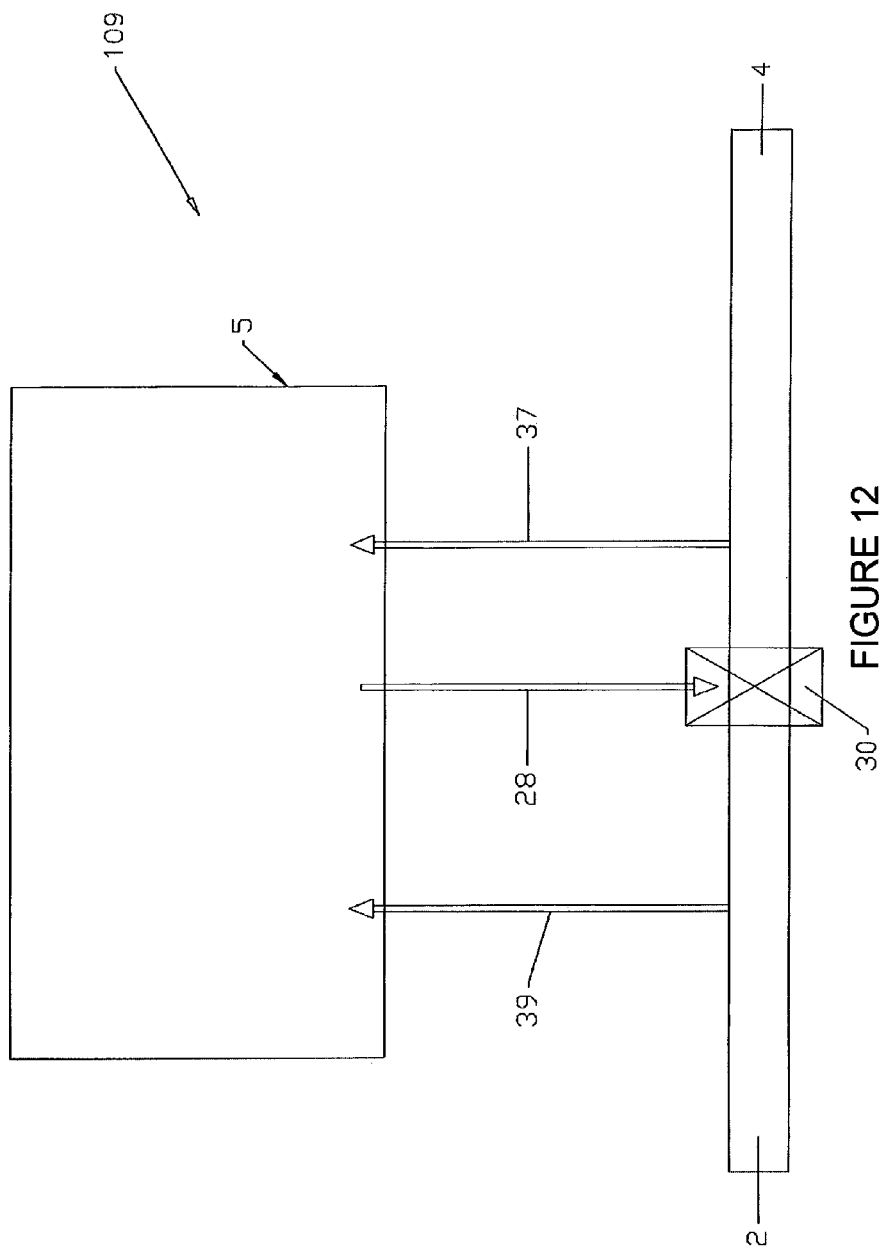

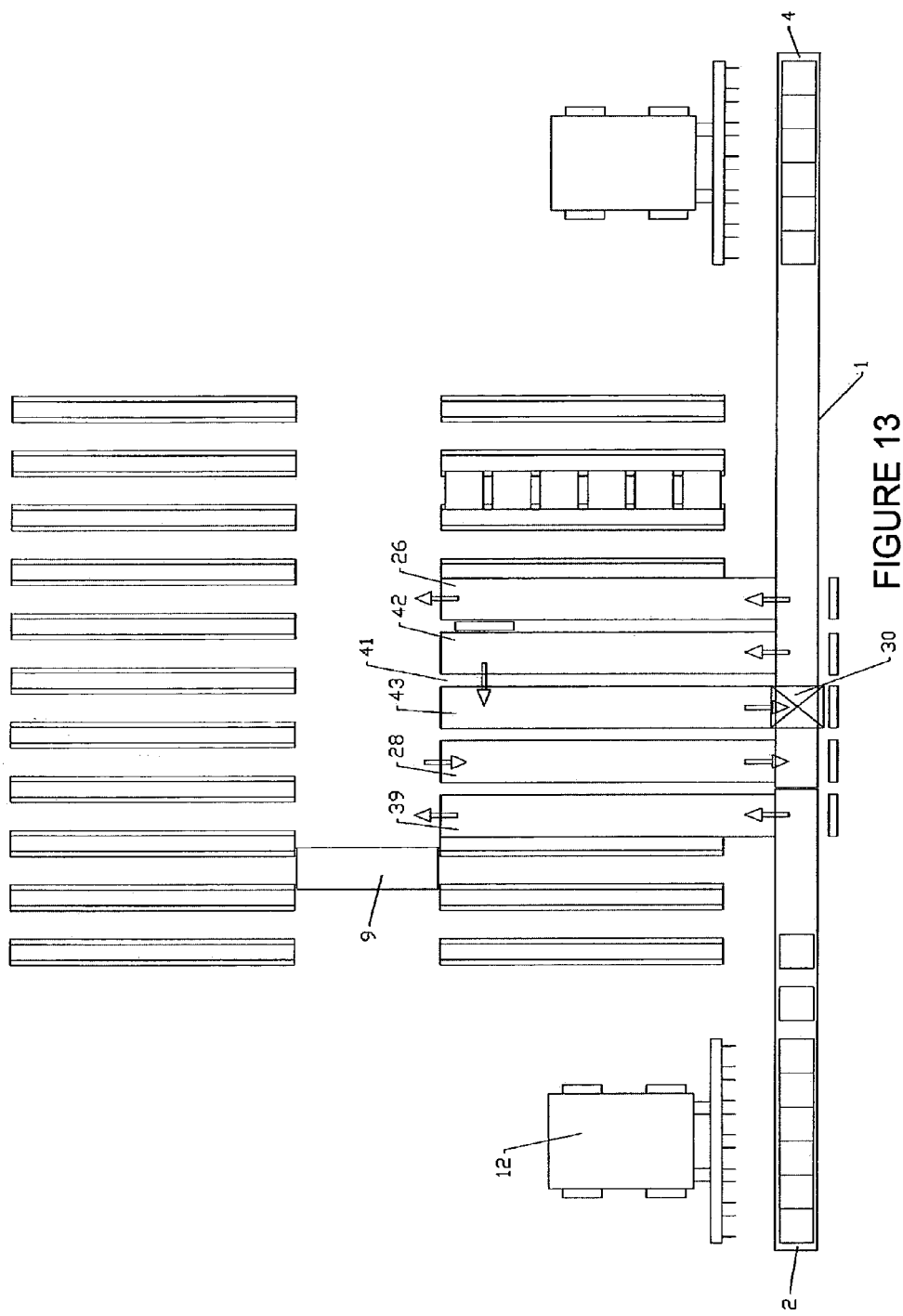

CONTAINER STORAGE AND RETRIEVAL SYSTEM AND METHOD

This application is a National Stage Application of PCT/NZ2010/000175, filed 3 Sep. 2010, which claims benefit of Serial No. 2009904222, filed 4 Sep. 2009 in Australia and which applications are incorporated herein by reference. To the extent appropriate, a claim of priority is made to each of the above disclosed applications.

TECHNICAL FIELD

This invention relates to a method and apparatus for storage in a warehouse environment of cases or other containers and to methods and apparatus for retrieval of containers.

Throughout this specification and claims, the word "container" is used to refer to any suitable means for holding product and may include for example, crates, boxes, tins, cartons, cases, totes, bound together product or the like and also includes a plurality of grouped containers, such as a pallet of containers or a group of bound containers.

BACKGROUND

The term "order picking" has become associated with systems designed for receiving, storing and delivering product to and from some form of storage area. They may also use some form of warehouse management system for co-ordination of storage.

Products for distribution are often stored in a warehouse and retrieved therefrom for loading onto a vehicle for transport to customers. In an effort to increase the speed and efficiency of the storage and delivery system, apparatus for automated retrieval, or "picking", of product from the storage space have been developed. This has represented a large advance in the efficiency of order picking systems, which traditionally heavily relied on manual handling. Further advantages of automated systems include reduced overall cost, increased accuracy and decreased risk of personal injury.

An ongoing problem faced by warehouse managers is the efficient use of space within a warehouse. Each square meter of floor space within the warehouse has an associated cost and the warehouse management system must seek to obtain the maximum use of the space in the warehouse to be efficient and competitive.

Picking systems, whether manual or automatic, typically have a defined and fixed "pick face", or surface from which they can retrieve product. One problem presented to pick systems is how to replenish pick locations once they have been emptied. Traditionally, such replenishment is performed manually, with the assistance of a forklift or similar. This requires access to all parts of the storage area, the access channels, roads or similar requiring valuable space. Another problem faced by pick system designers is how to minimise the distance that the picking means, automated or manual has to travel to fulfill typical orders. The more the picking means has to travel, the longer the picking takes.

Due to demand variations, some products will invariably ship in greater quantities than others. Individual deliveries to customers may consist of relatively large quantities of a few products, but only a few, or even single cases or individual items of other products. This variability of product volumes presents a logistics problem in attempting to use the available resources, whether automated or manual or a combination most efficiently to obtain the best throughput.

Furthermore, the product stored in a warehouse may include a substantial variety of any given product. For example, a warehouse storage for milk will include crates containing cartons or bottles of different capacity, different flavour (e.g. conventional, chocolate, strawberry, banana, etc) and of different constituents or nutritional composition (e.g. full fat, trim, super-trim, skim, high calcium, etc). In addition, the product may be sorted by date of production. Thus, a warehouse may contain a large range of product over a wide area. Selection of the product to fill specific orders is, consequently, a complex process requiring: a) a sophisticated warehouse management system for the location of product delivered and stored, and for the selection of product for an order; and b) an efficient system for access to and removal of product from the storage area to fill an order.

Automated, robotic systems for order picking generally involve an x-y gantry system and a design for picking up individual containers or individual stacks of containers and transporting them from or to a conveyor. In the usual course, orders are delivered on pallets. Thus, the individually collected containers must then be formed into stacks of a required height, the stacks then formed into frames or partial frames of a required width and the frames or partial frames combined to form a pallet unit.

Such systems can be inefficient and/or impractical in a large warehouse environment where orders require product to be collated from many different parts of the warehouse. The robotic pickers have to cover large distances, back and forth, in the warehouse to complete a given order.

An existing automated storage and retrieval system is available from Automated Fork Truck Inc. of Salt Lake City, Utah, United States of America. This system is a storage and retrieval fork system that stores and retrieves product from vertically stacked racks. The system places product into and retrieves product from the racks through a vertical pick face at the end of a number of stacked racks and each rack being more than one pallet deep, with pallets being pushed away from the pick face for storage of another pallet in the same rack. With this system, the number of pick faces is limited and removal of individual containers from within pallets is not facilitated.

U.S. Pat. No. 6,061,607 discloses an order picking system for retrieving high volume and low volume product from two separate regions, but more specifically involves the location of product in vertical stacks in cells of totes. Low demand product is retrieved by a picker mechanism in a pick zone, by movement of that mechanism vertically above the pick zone and selection of individual articles from selected cells in selected totes. The system is primarily directed towards storage and retrieval of individual articles, which may be of high or low demand, rather than of containers containing a plurality of articles, which must, inevitably, be stored and transported in a different way.

U.S. Pat. No. 5,636,966 discloses a case picking system that removes full layers of cases and individual cases from storage towers. The storage towers are replenished from a further tower acting as a replenishment system. This requires double-handling of the transported layers. Moreover, the layers themselves are more demanding in their transport requirements than are individual cases or pallets.

In order to maximise the efficiency of such a system, it is important that the largest "natural unit of handling" be used where ever possible. Typically one "natural unit of handling" may be a full stack of a defined number of containers. A larger natural unit of handing may be a defined number of full stacks, referred to herein as a "frame". The number of stacks in a frame, and the number of containers in a full stack, may be determined by the physical limitations of the bulk shipping and container handling apparatus. For example, the size of a frame of product, e.g. 6 full stacks, each 6 containers high, may be determined by the maximum number of containers which a specially equipped forklift can carry.

Efficiency within the warehouse is promoted by moving and storing frames of product together wherever possible, and by moving full stacks of product wherever it is not possible to move entire frames, or where less than an entire frame is required.

International Application No. PCT/NZ2002/000008 describes an order picking system whereby product is stored in high, medium and low demand zones, with high demand product being handled in frames, medium demand product being handled in full stacks and low demand product being handled in stacks or partial stacks. This system works well, but may not make optimum use of the space available.

The reference to any prior art in this specification is not, and should not be taken as, an acknowledgement or any form of suggestion that the prior art forms part of the common general knowledge in any country.

OBJECT OF THE INVENTION

It is an object of the present invention to provide a system for storing and/or retrieving containers that efficiently uses the available footprint and/or quickly stores and retrieves product, overcoming or alleviating problems with storage and retrieval systems at present.

It is an alternative object of the present invention to provide a method for storing and/or retrieving containers that efficiently uses the available footprint and/or quickly stores and retrieves product, overcoming or alleviating problems with storage and retrieval methods at present.

It is an alternative object to at least provide the public with a useful choice.

The above objects are to be read disjunctively.

Further objects of the invention may become apparent from the following description, given by way of example only.

BRIEF SUMMARY OF THE INVENTION

According to a first broad aspect of the present invention there is provided a system for storing and retrieving containers, the system comprising:
  providing a first conveying means operable to move stacks of containers between a loading position and a discharge position;
  a container storage area;
  a container store dispatch conveyor;
  a container store delivery conveyor;
  first transfer means for transferring containers from the container store dispatch conveyor to the first conveying means;
  second transfer means for transferring containers from the first conveying means to the container store delivery conveyor;
  container store storage/retrieval means adapted to move containers from the container storage area to the container store dispatch conveyor and from the container store delivery conveyor to the container storage area; wherein
  the first conveying means is provided with stack destacking means capable of destacking full stacks into at least two partial stacks, the stack destacking means positioned to allow containers which have passed through the destacking means to be delivered to the container store by the container store delivery conveyor.

Preferably the stack destacking means is a combined stacking/destacking means.

Preferably, the stack destacking means is positioned to receive containers dispatched from the container storage area by the container store dispatch conveyor. Alternatively the system may be provided with a second stack destacking means positioned to receive containers dispatched from the container storage area by the container store dispatch conveyor.

Preferably, the system includes a full stack delivery conveyor, adapted to transport full stacks of containers from the first conveying means to the container storage area.

Preferably, the system includes a partial stack storage conveyor loop adapted to transport selected partial stacks to the container storage area.

Preferably the partial stack storage conveyor loop includes a first partial stack storage conveyor and a second partial stack storage conveyor.

Preferably the container store storage/retrieval means includes a crate robot.

Preferably the crate robot is provided with a platform adapted to support at least one stack. Alternatively the crate robot is provided with a conveyor.

Preferably the crate robot is adapted to engage and transport a plurality of stacks at once.

Preferably crates are stored in the container storage area in rows of stacks, each row having a predetermined maximum number of stacks (N).

Preferably the crate robot is adapted to engage and transport a number of stacks at once, the number being equal to or greater than N.

Preferably the crate robot is adapted to support at least a full frame of stacks.

Preferably the container store dispatch conveyor is adapted to support at least as many stacks as the crate robot.

Preferably, the container store includes a plurality of rows of containers arranged in a first rank of rows.

Preferably, the first rank is substantially parallel to the first conveying means.

Preferably, the container store includes a plurality of rows of containers arranged in a second rank of rows.

Preferably, the second rank is substantially parallel to the first conveying means, and is provided between the first rank and the first conveying means.

Preferably first rank and second rank are spaced apart to create an aisle therebetween.

Preferably the crate robot is moveable along the aisle.

According to a second broad aspect of the present invention there is provided a system for storing and retrieving containers, the system comprising:
  first conveying means operable to move stacks of containers between a loading position and a discharge position;
  a container storage area adjacent to the first conveying means in which containers are stored in rows of stacks, wherein the rows are substantially transverse to the first conveying means, and each row has a predetermined maximum number of stacks;
  container loading means for transferring containers from the first conveying means to the container storage area; and
  container retrieving means for transferring containers from the container storage area to the first conveying means.

Preferably the container retrieving means can retrieve a predetermined maximum number of stacks in a single operation; wherein:
the predetermined number of stacks in at least one of the rows of the container storage area is greater than the maximum number of stacks which can be retrieved from container storage area by a single operation of the container retrieving means.

Preferably the predetermined number of stacks in each row of the container storage area is greater than the maximum number of stacks which can be retrieved from container storage area by a single operation of the container retrieving means.

Preferably the container retrieving means can retrieve a maximum of one full stack of containers per operation.

Preferably the container storage area is provided with moving means for moving stacks of containers stored therein towards the first conveying means.

Preferably the container storage area is provided with parallel spaced-apart support members adapted to support a base the stacks in the row, and the container storage area is provided with one or more index conveyors engageable with one or more containers supported by the support members to transport it or them longitudinally, wherein said one or more index conveyors is movable transverse to said support members below said support member to enable selective engagement with containers positioned on said support members.

Preferably the first conveying means includes a single endless conveyor. Alternatively the first conveying means includes a loading conveyor and an unloading conveyor substantially parallel and adjacent to the loading conveyor.

Preferably the first conveying means includes a carriage. Preferably the carriage is adapted to carry one full frame of containers.

Preferably the first conveying means is operable to convey stacks of containers from the loading position to the discharge position without handling by the container loading means or container retrieving means.

Preferably the first conveying means includes spacing means adapted to create predetermined spaces between consecutive stacks of containers.

Preferably the container loading means and container retrieving means are the same mechanism.

Preferably the mechanism is a crate robot.

Preferably the container retrieving means includes the crate robot and a container store dispatch conveyor.

Preferably the system includes a control means adapted to receive an order.

Preferably the control means determines a required number of each type of containers to be retrieved from the container storage area, and a required number of each type of containers to be moved from a bulk storage area to the first conveying means, to fulfill the order.

Preferably the control means operates the container retrieving means to move the containers from the container storage area to the first conveying means.

Preferably the control means creates an output signal indicative of the containers to be moved from the bulk storage area to first conveying means.

Preferably the control system monitors the position of each container in the container storage area.

Preferably the system includes means for determining the presence of vacant spaces on the first conveying means which are sufficiently large to accommodate a stack of containers.

According to a third broad aspect of the present invention there is provided a method of storing and retrieving containers, the method comprising:
providing a first conveying means operable to move stacks of containers between a loading position and a discharge position;
storing containers in a container storage area which is adjacent to the first conveying means;
providing container loading means for transferring containers from the first conveying means to the container storage area;
providing container retrieving means for transferring containers from the container storage area to the first conveying means, wherein the container retrieving means can retrieve a predetermined maximum number of stacks in a single operation; wherein
the method further includes storing the containers in the container storage area in rows of stacks which are substantially transverse to the first conveying means, wherein at least one of the rows has a predetermined maximum number of stacks which is greater than the maximum number of stacks which the container retrieving means can retrieve in a single operation.

According to a fourth broad aspect of the present invention there is provided a method of storing and retrieving containers, the method comprising:
providing a first conveying means operable to move stacks of containers between a loading position and a discharge position;
transferring stacks or partial stacks of containers from the first conveying means to a container storage area, and/or from the container storage area to the first conveying-means, as required to supply a required number of containers to the discharge position; and
the method further including destacking selected stacks of containers which are being moved by the first conveying means into first and second partial stacks, and moving one of the partial stacks to the container storage area, if necessary to provide the required number of containers to the discharge position.

Preferably the method includes moving whole stacks from the first conveying means to the container storage area with a full stack delivery conveyor.

Preferably the method includes moving partial stacks from the first conveying means to the container storage area with a remainder conveyor, which is separate from the full stack delivery conveyor.

Preferably the method includes storing selected partial stacks on a partial stack storage conveyor loop.

According to a fifth broad aspect of the invention there is provided a method of operating a container storage and retrieval system comprising a bulk storage area, a container storage area and a dispatch area, the method including receiving an order for one or more types of containers, and for each type of container:
Calculating the required number of containers (N) divided by the number of containers in a frame (F) to obtain a quotient (Q) and a remainder (R);
Moving Q frames from the bulk storage area to the dispatch area;
Determining the number (C) of the required type of containers in the container storage area; and
If C≥R moving R containers to the dispatch area; or
If C<R, moving a frame of containers from bulk storage area, then moving (F−R) containers from the frame to the container storage area and moving the remaining containers from the frame to the dispatch area.

According to a sixth broad aspect of the invention there is provided a method of operating a container storage and retrieval system comprising a bulk storage area, a container storage area and a dispatch area, the method including receiving an order for one or more types of containers, and for each type of container:

- Calculating the required number of containers (N) divided by the number of containers in a frame (F) to obtain a quotient (Q) and a remainder (R);
- Moving Q frames from the bulk storage area to the dispatch area;
- Determining the number (C) of the required type of containers in the container storage area; and
- If C≥R, moving R containers to the dispatch area; or
- If C<R, moving C containers from the container storage area to the dispatch area, moving a frame of containers from bulk storage area, then moving (F−(R−C)) containers from the frame to the container storage area and moving the remaining containers from the frame to the dispatch area.

According to a further aspect of the invention there is provided computer readable instructions which when executed on a suitably enabled processing device are configured to perform and/or generate control signals for performing the method of any one of the third, fourth, fifth or sixth aspects.

According to a still further aspect of the invention there is provided a container storage and retrieval system comprising processing means for performing and/or generating control signals for performing the method of any one of the third, fourth fifth or sixth aspects.

According to a further aspect of the present invention, a system for storing and retrieving containers and/or a method of storing and retrieving containers is substantially as herein described, with reference to any one or more of the examples or accompanying drawings.

The invention may also be said broadly to consist in the parts, elements and features referred to or indicated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

Further aspects of the invention, which should be considered in all its novel aspects, will become apparent from the following description given by way of example of possible embodiments of the invention.

BRIEF DESCRIPTION OF THE DRAWINGS

FIG. 3: Is a diagrammatic view of an index conveyor in a disengaged position beneath a number of containers supported by a container storage means.

FIG. 4: Is a diagrammatic view of the index conveyor of FIG. 3 in an engaged position.

FIG. 5: Is a schematic diagram of a third embodiment of a container storage and retrieval system of the present invention.

FIG. 12: Is a schematic diagram of a still further embodiment of a container storage and retrieval system of the present invention.

FIG. 13: Is an alternative embodiment of the system shown in FIGS. 10 and 11.

DEFINITIONS

Unless the context clearly requires otherwise the terms below are to be read as having the following meaning:

"Crate Robot"—refers to a mechanism capable of moving one or more stacks or partial stacks of containers along at least two orthogonal axes, for example a gantry robot.

"Container"—refers to any unit for holding one or more items or products which can be stacked one on top of another, and includes, without limitation, crates, boxes, tins, cartons, cases, totes or a plurality of grouped containers, such as a pallet of containers or a group of bound containers.

"Frame"—refers to a set number of stacks, side by side in a row.

"Full Stack"—refers to a set number of containers, one on top of the other.

"Index conveyor"—refers to a conveying mechanism for conveying product within a given row of storage area.

"Order"—refers to a required combination of containers of one or more varieties of items.

"Partial stack"—refers to fewer than the set number of containers which form a full stack.

"Stack"—refers to any number of containers, one on top of another, and includes a partial stack and a full stack.

BRIEF DESCRIPTION OF POSSIBLE EMBODIMENTS OF THE INVENTION

The present invention will now be described with reference to specific embodiments thereof, in which similar reference numbers indicate similar features.

Figure 1:
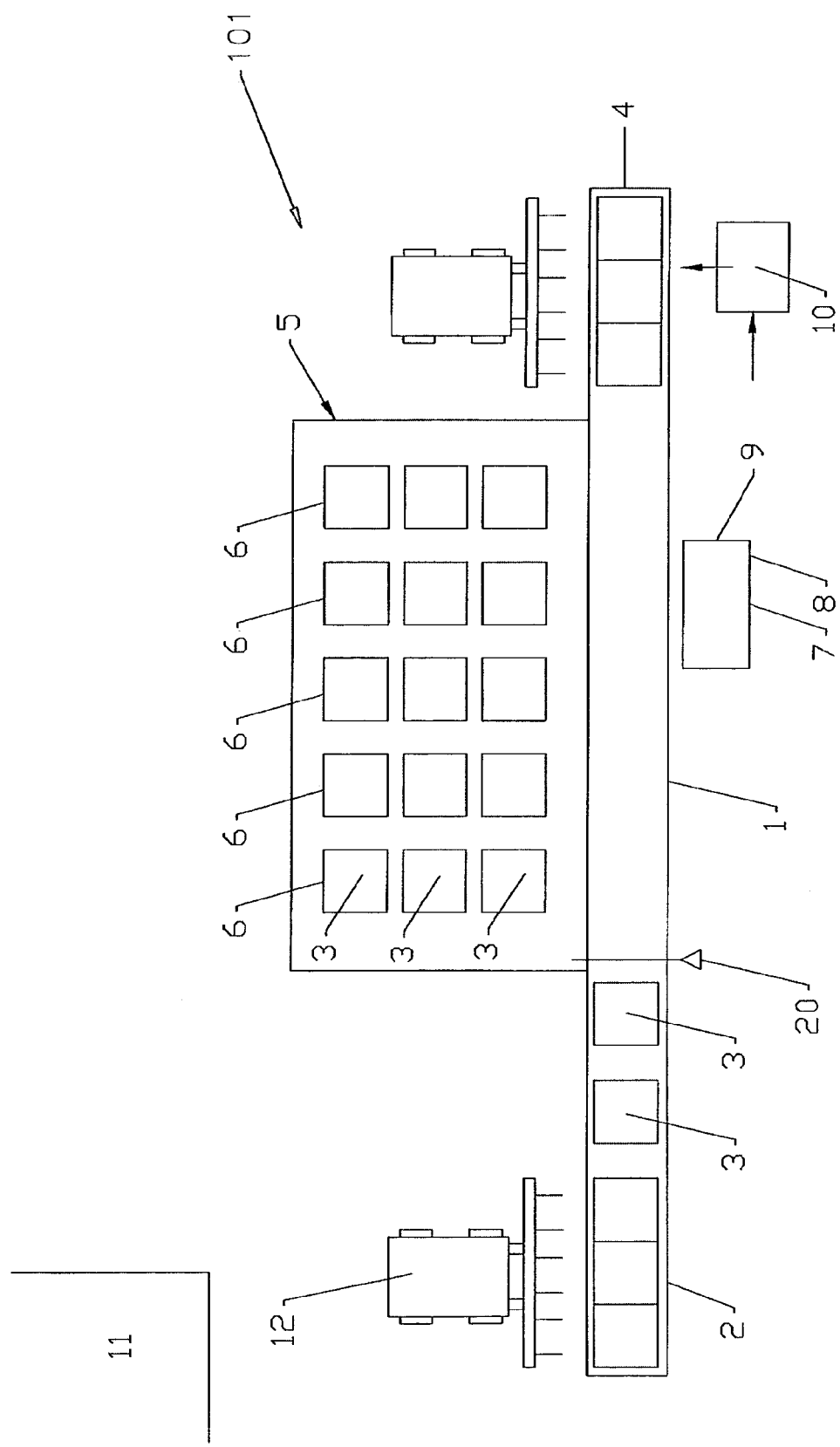
FIG. 1: Is a schematic diagram of a first embodiment of a container storage and retrieval system of the present invention.

Referring first to FIG. 1, a system for storing and retrieving containers according to one embodiment of the present invention is generally indicated by arrow 101.

The system 101 includes a first conveying means 1. Unless otherwise stated, the first conveying means 1 is an endless conveyor. The first conveying means 1 is operable to move containers between a loading position 2, at which stacks of containers 3 are loaded on the conveying means, and a discharge position 4, from which containers are removed. In a preferred embodiment containers are loaded onto the main conveying means 1 one frame at a time, for example by a suitably equipped forklift.

A container storage area, hereinafter referred to as a container store, is generally referenced by arrow 5. Containers are stored within the container store in rows of stacks 6, with each row 6 containing a predetermined maximum number of stacks. The rows 6 are adjacent and substantially transverse to a portion of the first conveying means 1.

The system 101 is provided with container loading means 7 for transferring containers or stacks of containers from the main conveyor 1 to the container store 5, and container retrieving means 8 for transferring containers or stacks of containers from the container store 5 to the main conveyor 1. As is described further below, in some embodiments the loading and retrieving means are combined into a single loading/retrieving means, such as a gantry based container transporting apparatus, referred to hereinafter as a crate robot 9. A suitable crate robot 9 is described in International Application No. PCT/NZ03/00090, the contents of which is included herein by reference. In other embodiments, described hereinbelow, separate loading and/or retrieving means may be used in addition to or as an alternative to the crate robot 9.

In the system 101 shown in FIG. 1 the container store 5 consists of five rows 6, although in most practical systems there will be more than 40 rows 6 in the container store 5. Although not shown in FIG. 1, in a preferred embodiment a second container store 5 may be provided on the opposite side of the first conveying means 1.

The maximum number of stacks of containers in at least one of the rows 6, and preferably all of the rows 6, may be greater than the number of stacks 3 which can be transported by the retrieving means 8 in a single operation. This minimises the dead space in the system 101, and minimises the system's footprint for a given storage capacity. In a preferred embodiment the retrieving means 8 is able to move only a single stack of containers per operation, and the number of stacks 3 in each row 6 is equal to the number of stacks 3 in a full frame.

In the example shown in FIG. 1, the stacks 3 in the container store 5 are stored in a static manner, that is, once the stacks 3 have been placed into the container store 5 they remain stationary until moved by the container retrieval means 8. However, as is described below with reference to FIGS. 2 to 4, in a second embodiment of the system the container store 5 includes means for moving the stacks 3 in the rows 6 along the row 6 towards or away from the first conveying means 1, without the use of the loading means 7 or retrieving means 8.

Referring back to FIG. 1, a control means 10, for example a computer, controls the operation of the conveyor 1 and the container loading and retrieving means 9. The system 101 may be operated in a number of ways to provide a required number of containers 3 to the discharge position 4 of the main conveyor 1.

In a first embodiment of the system 101 the control means 10 receives an order for a required number $N_X$ of containers containing a certain item X, and a required number $N_Y$ of containers of a different item Y. If both $N_X$ and $N_Y$ are equal to or divisible by the number of containers in a frame of containers then the control system sends a signal which is interpreted as a request for the requisite number of whole frames of each product to be loaded from a bulk storage area 11 (only a portion of which is shown in the Figures) onto the loading position 2 of the first conveying means 1, for example by a forklift. The signal may be any suitable signal, for example some sort of electronic display. The first conveying means 1 then moves the frame of containers to the discharge position 4 where the containers are collected and dispatched. In an alternative embodiment the control system may direct that the frame be dispatched directly from the bulk storage area 11, bypassing the first conveying means 1, or a separate conveyor (not shown) may be provided for transferring full frames to the discharge area 4, thereby bypassing the containers store and associated transfer equipment If either $N_X$ or $N_Y$ is less than a full frame, or if there remain crates to be supplied for the order once the requisite number of full frames of X or Y have been supplied, then the control system may review its record of the containers resident in the container store. If the required number of containers of the relevant type are present in the container store 5 then the control system may identify which row 6 the containers reside in, for example by reference to a table held in system memory, and may operate the crate robot 9 to transfer the required number of containers to the first conveying means 1 from the relevant row 6 to the first conveying means 1. The crate robot 9 will transfer groups of containers, starting from the top of each stack and working from the nearest stack (of the relevant type of containers) to the first conveyor 1 to the stack which is most far away, until the required number has been supplied.

If the number of the relevant variety of containers resident in the container store 5 is insufficient to make up the order then the control means 10 may send a request for a full frame to be delivered to the loading position 2. The control means 10 may then operate the crate robot 9 to remove the containers not required to fulfill the order from the first conveying means 1, and store them in the container store 5, thereby replenishing the container store. The remainder of the containers on the main conveyor 1 travel to the discharge position 4, where they are picked up and dispatched. Alternatively the control means 10 may operate the crate robot 9 to transfer some number of containers from the store to the first conveying means 1, for example part of a stack in the location closest to the first conveying means 1, and may remove from the full frame just delivered the number of containers which are in excess of that required to fulfill the order from the first conveying means, together with a number equal to that transferred from the store.

A number of variations are possible. In one embodiment the control means may direct the crate robot 9 to remove partial stacks from the full stacks being conveyed on the first conveying means 1 and place them in the container store 5. In other embodiments the control means may direct the crate robot 9 to replenish the container store 5 with full stacks only. In embodiments in which the container store 5 is replenished with full stacks only, apparatus other than the crate robot may be provided to perform the function of loading containers from the main conveyor 1 to the container store 5, thereby freeing the crate robot 9 to perform the task of retrieving containers from the container store 5. A number of container loading mechanisms are possible, including pushers, transfer spurs, a suitable index conveyor or an overhead crane.

Figure 2:
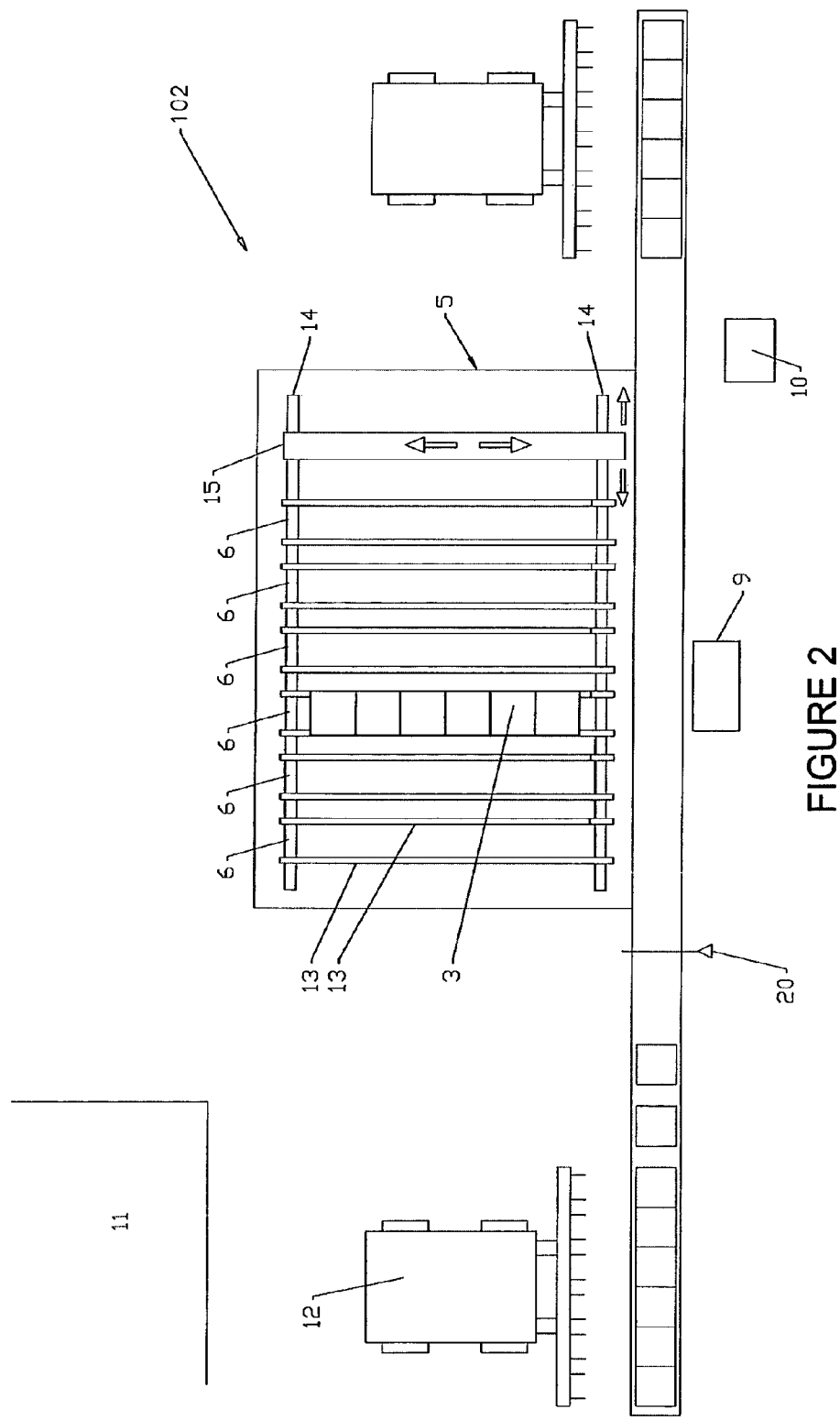
FIG. 2: Is a schematic diagram of a second embodiment of a container storage and retrieval system of the present invention

Referring next to FIGS. 2-4, a second embodiment of the invention, generally referenced by arrow 102, is shown. The system 102 includes a plurality of parallel, spaced-apart support members 13 adapted to support the bases the containers stored in the rows 6. Each pair of support members 13 is adapted to support the base of the container at the bottom of the stack by opposite opposing edges so that the main region of the base is accessible from beneath. It will be appreciated that an alternative arrangement could involve containers supported in each row by a single central support member, with engagement from beneath, by an engagement portion of the conveyor, by opposite edges of the containers.

Beneath the support members 13 are transport rails 14 on which is supported an index conveyor 15. The index conveyor 15 is parallel to the rows 6 and transportable beneath those rows 6. It includes means for engaging with the base of one or more containers at the bottom of a stack or stacks positioned within a row 6, and transporting that stack or stacks along that row 6 in either longitudinal direction.

Whilst the embodiment shown in FIGS. 2-4 presents the index conveyor 15 as a single elongate unit, it could alternatively be in a number of separate segments, each segment extending beneath a given portion of the length of a row 6. With such a segmented index conveyor different stacks of containers could be moved in different directions within a row. In addition, there may be more than one index conveyor 15 operating beneath the rows 6. However in some other embodiments each row may be provided with a separate moving means, for example a conveyor.

Referring next to FIG. 5, an alternative embodiment of the system is generally referenced by arrow 103. In the embodiment shown in FIG. 5, the container store 5 is provided on one side of the first conveying means 1 only, with an area on the opposite side of the first conveying means 1 designated for storage of one stack or partial stack of containers per row 6 of containers in the container store 5. This area is hereinafter referred to as the excess container store 16. In this embodiment the control means directs the loading mechanism or combined loading and retrieving means 9 to load only full stacks into the container store 5. If the order requires a partial stack, then the control means 10 determines whether the order can be fulfilled from containers stored in the excess container store 16. If this is not possible then the control means 10 directs that at least one full stack be placed on the first conveying means 1 and removes the unneeded containers from the top of a stack, and stores them in the excess container store 16, allowing sufficient containers to fill the order to move through to the discharge position 4. In this embodiment a container stacker 17 may be provided towards the discharge position 4, that is, between the container store and the discharge position, to create full stacks from the partial stacks created. Alternatively a crate robot 9 may be used to create full stacks from any partial stacks.

In alternative embodiments (not shown) the container storage area 5 may be provided with alternative means of supporting and moving the containers. In some embodiments each set of support members 13 may be provided with an individual powered conveyor. In other embodiments the support members and powered conveyors may be replaced by gravity feed roller conveyors which are sloped so as to bias the stacks of containers towards the first conveying means 1.

Figure 6:
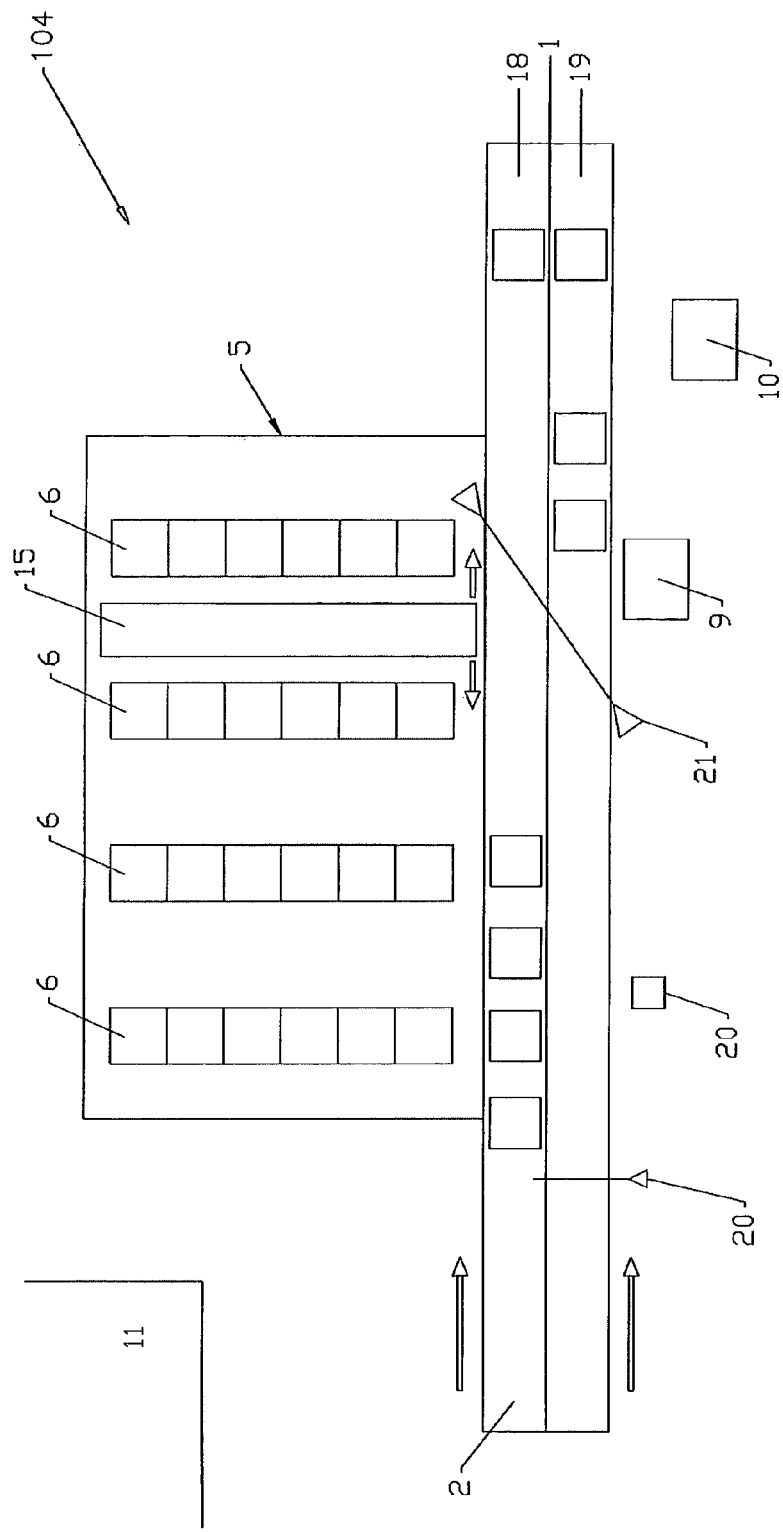
FIG. 6: Is a schematic diagram of a fourth embodiment of a container storage and retrieval system of the present invention.

Referring next to FIG. 6, in a still further variation, generally referenced by arrow 104, the first conveying means 1 may include a separate loading conveyor 18 and unloading conveyor 19. The loading and unloading conveyors 18, 19 may be operable independently by the control means 10, or alternatively may operate continuously, either at the same speed or at different speeds. The use of separate loading and unloading conveyors may be particularly preferred if means other than a crate robot are used to load the container store 5.

In each of the embodiments above, it is necessary for the control means 10 to have accurate information as to the location of the containers on the main conveyor 1. This information is necessary to ensure that the crate robot 9 moves to the correct position to remove selected containers from the main conveyor, and to accurately place containers from the container store 5 onto the first conveying means 1, either in a free space or on top of another partial stack, as required.

The positioning of stacks at the loading position 2 may not be sufficiently accurate to be relied on, particularly if performed manually by a forklift. Accordingly, the system may include one or more position sensors 20, for example an optical sensor, which can sense the proximity of at least the leading edge of a stack of crates. By monitoring the movement of the first conveying means 1 and the position of the stacks on the first conveying means 1, the control means 10 is able to keep an accurate record of the position of the containers which are being moved into or through the system by the first conveying means 1. The control means 10 preferably receives information as to the position of containers placed on the first conveying means 1 by the crate robot 9 directly from the crate robot 9, which is preferably provided with accurate position measuring means which measure and report the position of the crate robot.

In some embodiments it may be preferable to provide mechanical "stops" which hold stacks in predetermined positions to allow movement from the first conveying means 1 to the container store 5. These stops could take the form of a short blade actuated by an air cylinder that can be moved into the path of a stack on a conveyor, generally striking the stack low down near the conveyor and causing the stack to stop. If the conveyor continues moving while the stop is engaged with the stack then the stack will skid on the conveyor. In some embodiments a stop may be provided adjacent each row 6 in the container store 5. However, these embodiments may require the main conveying means 1 to move at less than an optimal speed. It is noted that in a preferred embodiment the main conveyor 1 moves at a substantially constant speed, although it may be necessary to halt the first conveying means 1 from time to time as part of the normal running of the system.

For embodiments which use a crate robot 9 which is provided with gripping means it may be necessary to space the stacks on the main conveying means 1 apart in order to allow space for the gripping means to engage the sides of the crates. One method of spacing the stacks is to provide a "stop", preferably near the loading position, which can be used while the first conveying means 1 is moving. In this way the stop can hold one stack in place while the main conveying means moves a leading adjacent stack further away.

In the embodiments referred to above it is necessary for the control means 10 to have relatively accurate information as to the location of containers on the first conveying means in order for the control means 10 to direct the apparatus to move the containers from the first conveying means 1 to the required position in the container store 5. However, when containers are to be moved from the container store 5 to the discharge position, in many embodiments, for example that shown in FIG. 6, the control means 10 may need only ascertain that a sufficiently large vacant space exists on the main conveying means 1 to receive the containers, rather than determining exactly where the other containers on the main conveying means are located. The presence of a vacant space may be determined by an optical sensor 21 which is angled across the main conveying means 1. In other embodiments, particularly those which use separate loading and unloading conveyors, the control means 10 may simply delay placing containers on the main conveying means 1 until a sufficient period of time has elapsed to ensure that any containers which were present on the relevant part of the conveyor at the start of the delay period have been moved through the relevant area, and the conveying means is clear.

In preferred embodiments the control means 10 can either track; or has a means of ascertaining, the position of all of the containers in the store. However, in other embodiments the control means may simply have means of measuring whether more than a threshold amount of each type of container is held in the container store 5.

Figure 7:
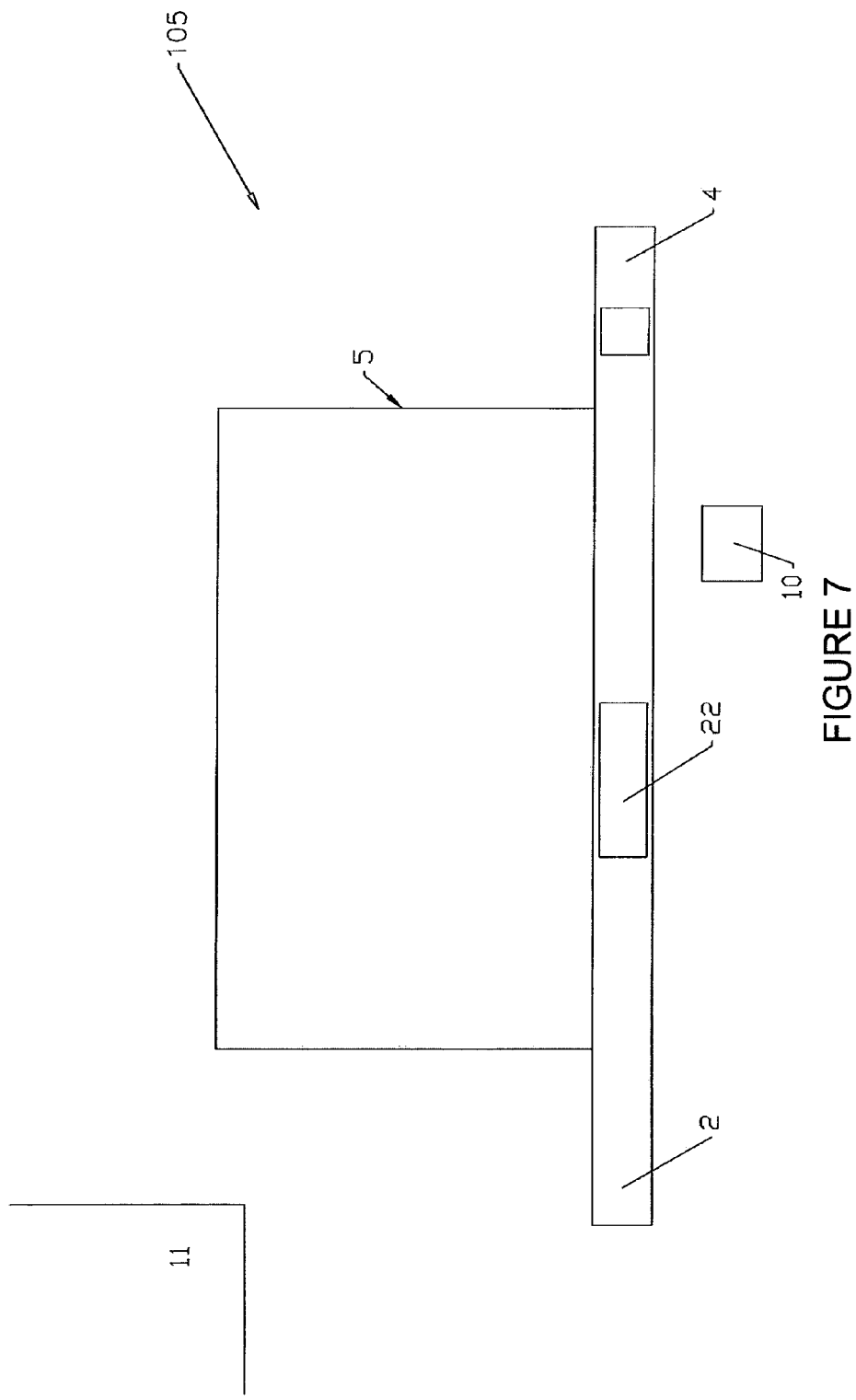
FIG. 7: Is a schematic diagram of a fifth embodiment of a container storage and retrieval system of the present invention, with containers in the container store not shown.

Referring next to FIG. 7, in another embodiment, generally referenced by arrow 105, the first conveying means 1 is a carriage or bogey 22 which is able to run between the loading position 2 and the discharge position 4. The bogey 22 is preferably controlled by the control means 10. The bogey is preferably capable of carrying at least one full frame of containers, preferably exactly one frame.

Figure 8:
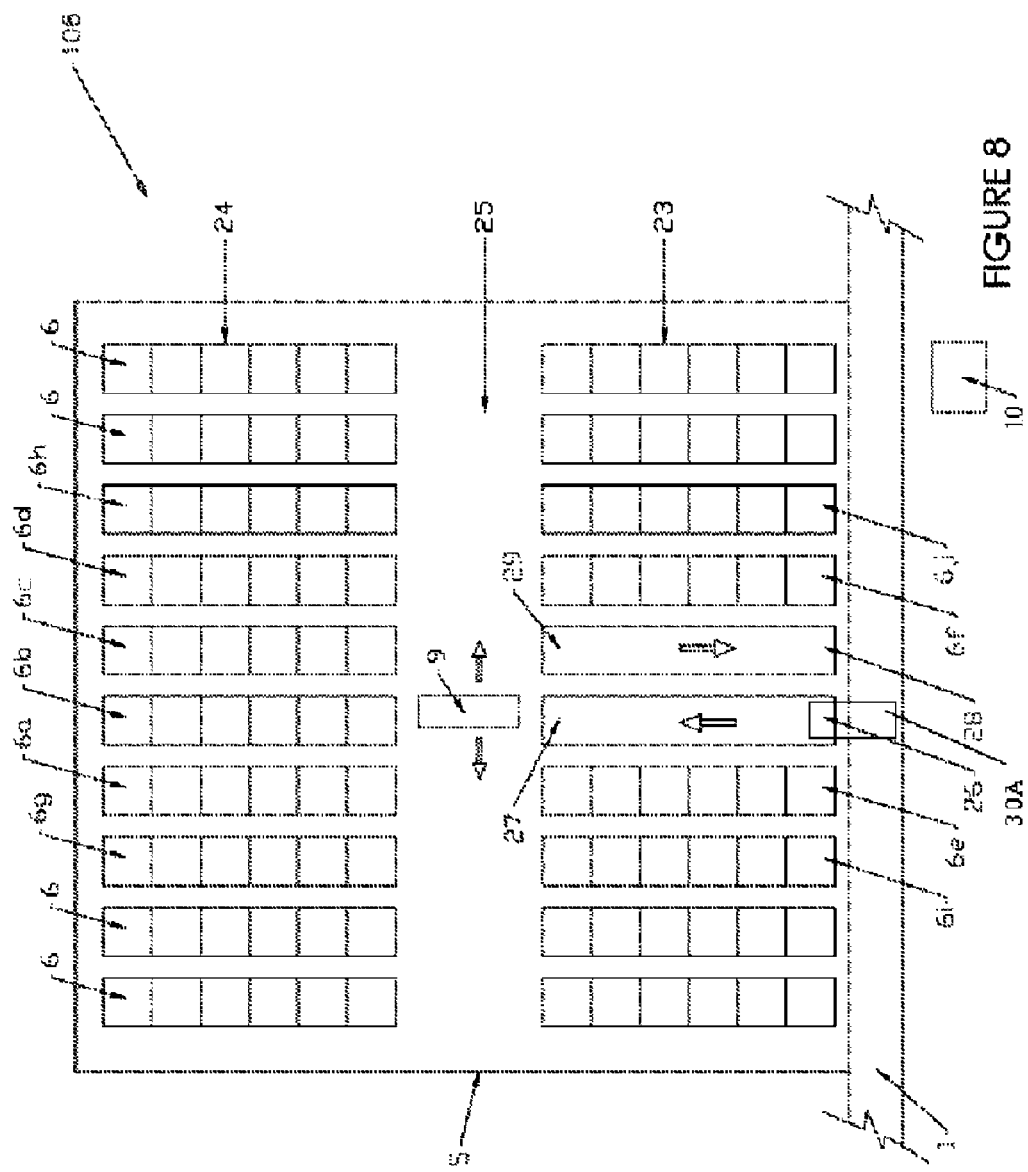
FIG. 8: Is a schematic diagram of another container storage and retrieval system of the present invention.

Referring next to FIG. 8, a further embodiment of the present invention is generally referenced 106. In this embodiment the container store 5 contains a relatively small number of rows 6, for example eighteen rows 6. The rows 6 are arranged in a first rank 23 of eight rows and a substantially parallel and adjacent second rank 24 of ten rows. The rows 6 of containers in the ranks 23, 24 are substantially transverse to the first conveying means 1, but the ranks of rows are substantially parallel to the first conveying means 1. The first rank 23 is substantially adjacent the first conveying means 1, and the second rank 24 is spaced from the first rank 23 so as to leave an aisle 25 large enough for a crate robot 9 to move between the ranks and thereby access the containers stored nearest the aisle 25.

A container store delivery conveyor 26 is provided to move containers from the first conveying means 1 to a pickup location 27 at the distal end of the container store delivery conveyor 26. A container store dispatch conveyor 28 is provided adjacent the first container store delivery conveyor 26 to move containers from a set down location 29 back to the first conveying means 1.

The container store delivery and container store dispatch conveyors 26, 28 are preferably substantially transverse to the first conveying means 1, and are arranged so that the pickup location 27 and dropoff location 29 are substantially in the centre of the container store 5, although offset towards the first conveying means 1 so as to leave the aisle 25 clear.

Suitable transfer means 30A are provided to transfer stacks which include containers destined to be placed in the container store 5 from the main conveying means 1 to the container store delivery conveyor 26. Such transfer means may include pushers, pop-up conveyor sections and devices that lift and move containers between locations.

The control means 10 arranges the containers in the container store so that items which are most requested are stored in the rows closest to the pickup and dropoff locations, 27, 29, for example in rows 6a-6f. The next most popular items may be stored in the next closest rows, for example 6g-6j, and so on, although in some embodiments it may be preferred to allow two or more types of containers to be stored in the same row in some circumstances.

By arranging the containers in the container store in this way, the average distance moved by the crate robot 9 is minimised, and the speed with which containers can be stored and retrieved is improved. The system is also simpler to implement than other embodiments of the invention, as the pickup and dropoff locations are fixed and stationary. However, it is still necessary to ascertain that there is space available on the first conveying means to receive containers from the container store dispatch conveyor 28, as is described above.

A number of such container stores may be associated with a single first conveying means.

In a variation of the invention shown in FIG. 8 the crate robot 9 may be provided with a platform (not shown) which moves with the crate robot along horizontal axes, but not in the vertical direction. Such a crate robot is described in international application No. PCT/NZ03/000090, the contents of which is herein included by reference.

The platform may be large enough to hold only a single stack, or more preferably multiple stacks. In a still further variation the platform may be replaced by a moveable container store conveyor. In this embodiment full stacks can be transferred between the delivery and dispatch conveyors and the container store by means of the moveable container store conveyor, without the use of the crate robot's gripping means. The gripping means may only be needed when a partial stack needs to be moved, leaving behind one or more crates from the bottom of the stack, or when a partial stack is to be placed on top of another partial stack. Using the moveable container store conveyor in this way allows multiple stacks to be moved on and off the crate robot at the same time, thereby increasing the speed over embodiments in which the gripping means must be used for every operation.

Figure 9:
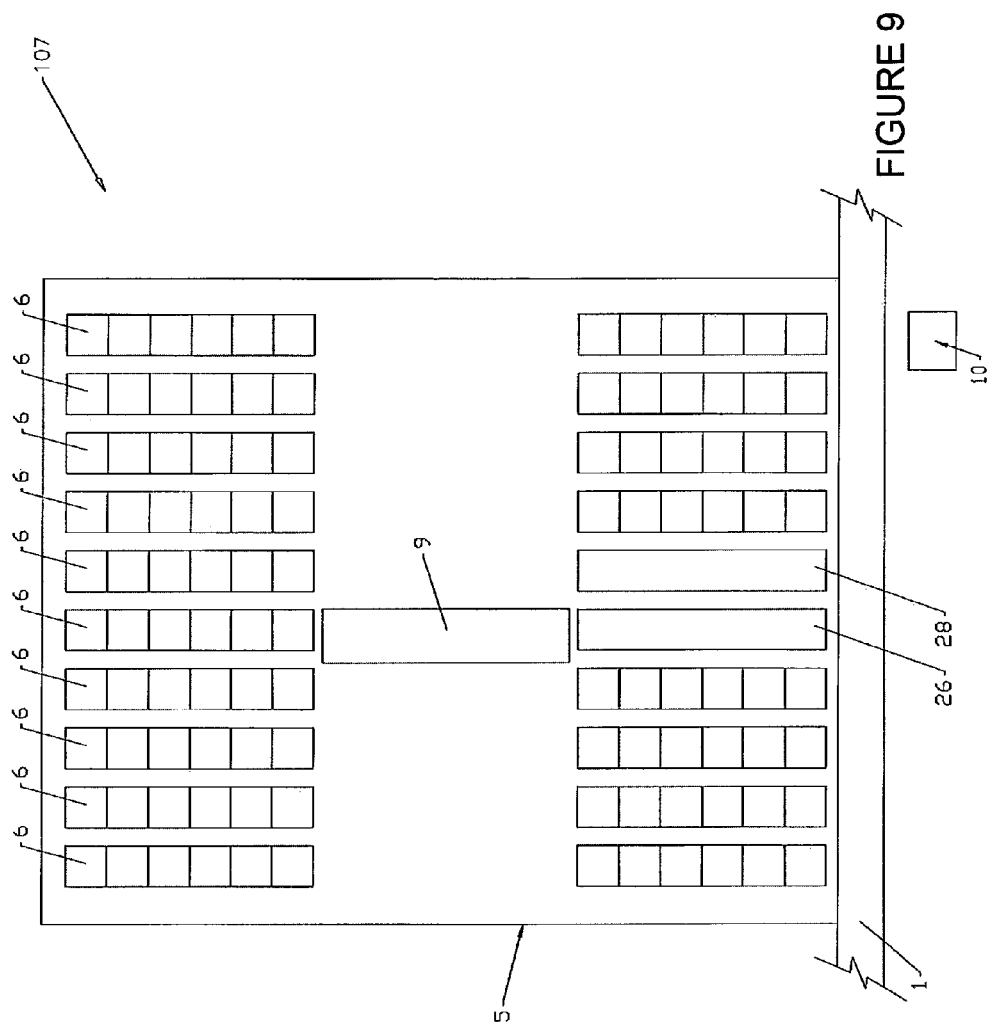
FIG. 9: Is a schematic diagram of a further embodiment of a container storage and retrieval system of the present invention.

Referring next to FIG. 9, in a still further variation of the embodiment shown in FIG. 8, a system 107 may include a crate robot 9 which has a gripping head adapted to grip at least the number of stacks which can be stored in the largest of the rows in the container store. The gripping head is adapted to be able to select which containers of the stacks are gripped, so that the head may engage with, for example three full stacks and one partial stack. This embodiment may eliminate the need for additional means of moving the containers along the rows, as the crate robot 9 is able to move any number of the stacks in a given row simultaneously.

Figure 10:
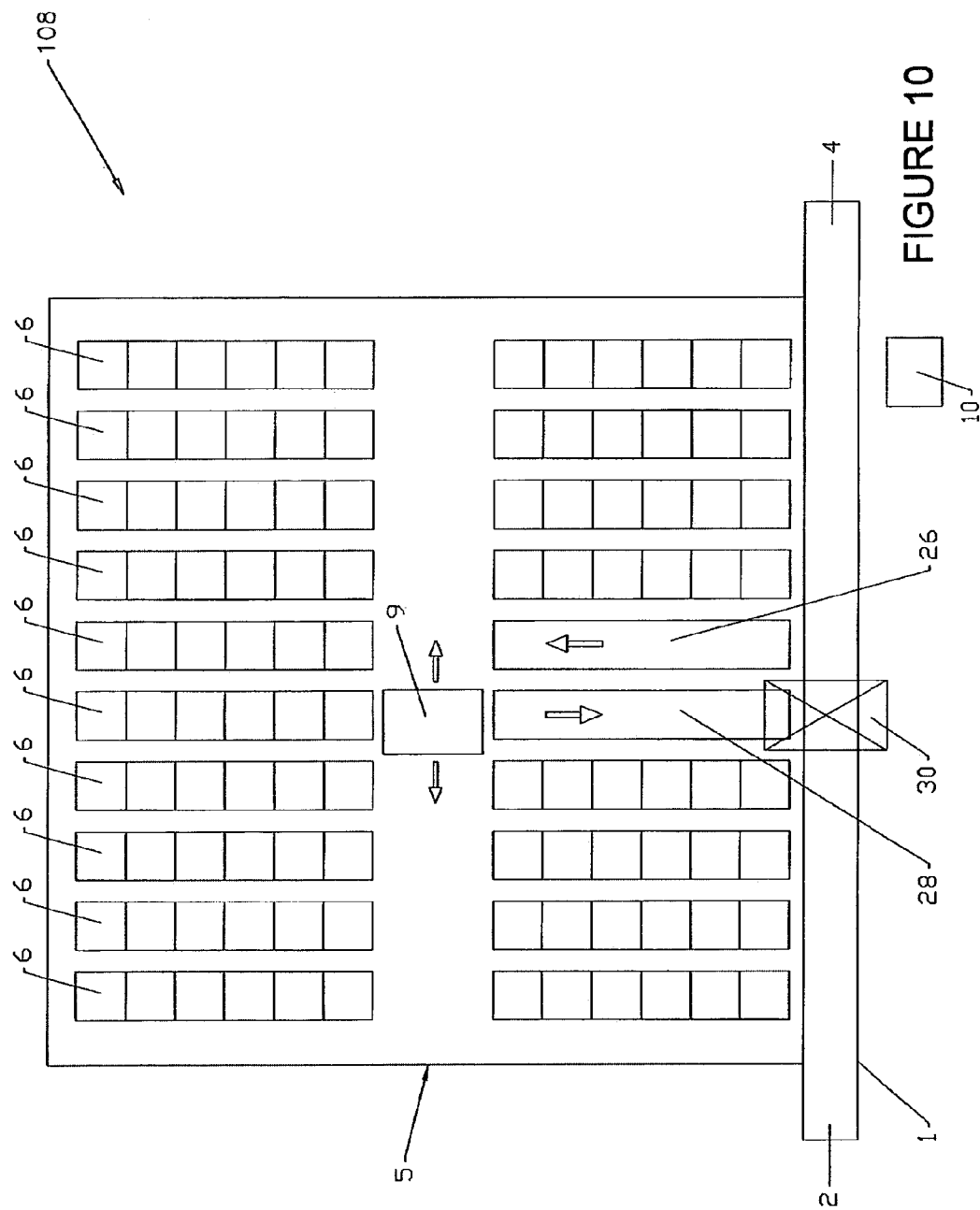
FIG. 10: Is a schematic diagram of a still further embodiment of a container storage and retrieval system of the present invention.

Referring next to FIG. 10, another system 108 is shown. In this system the container store 5, first conveying means 1, container store delivery conveyor 26 and container store dispatch conveyor 28 are arranged substantially as described above with reference to the embodiment 106 shown in FIG. 8, except the container store dispatch conveyor 28 is closer to the loading position 2 of the first conveying means 1 than the container store delivery conveyor 26 is.

A stacking/destacking means 30 is provided, either adjacent the intersection of the container store dispatch conveyor 28 and the first conveying means 1, or over or adjacent the first conveying means 1 between the container store dispatch conveyor 28 and the container store delivery conveyor 26.

The stacking/destacking means 30 is adapted to destack full stacks into at least two partial stacks, and to create a single stack by stacking two or more partial stacks, as required. The operation of the destacking means will be described with reference to FIGS. 11A-11D.

Figure 11A:
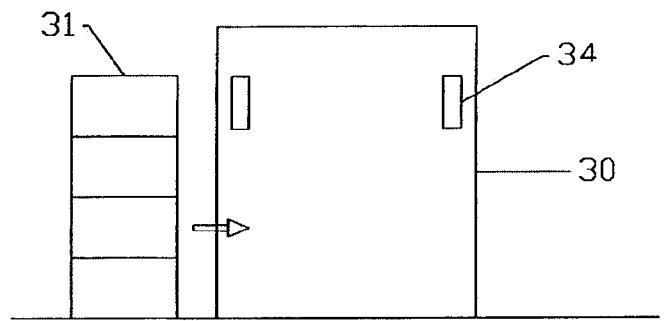
FIG. 11A: Is a schematic cross section side view of a stack moving into a destacking means of the present invention
Figure 11B:
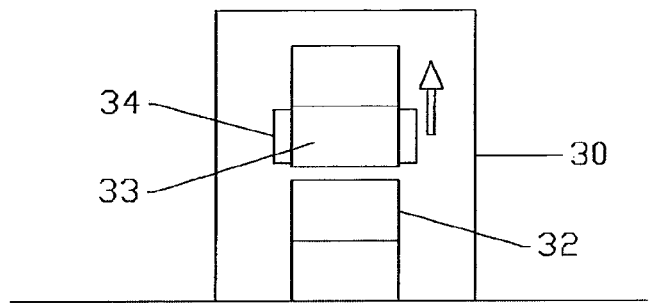
FIG. 11B: Is a schematic cross section of the destacking means of FIG. 11A separating a stack into a first partial stack and a second partial stack.
Figure 11C:
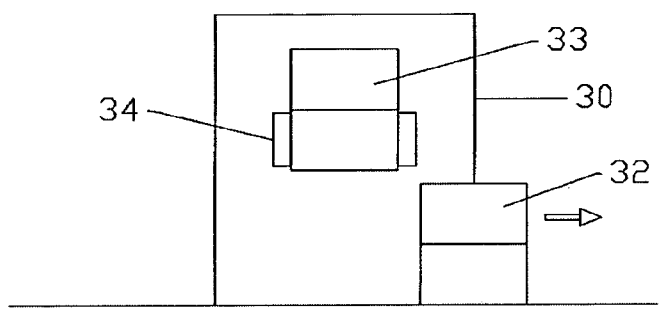
FIG. 11C: Is a schematic cross section of the destacking means of FIG. 11A, with first conveying means moving the first partial stack away.
Figure 11D:
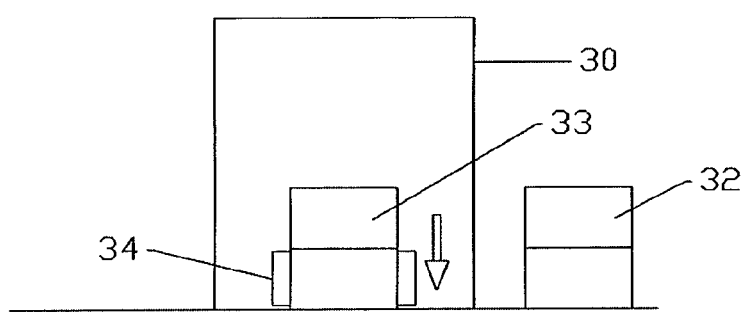
FIG. 11D: Is a schematic cross section of the destacking means of FIG. 11A lowering the second partial stack onto the first conveying means.

In the example shown in FIGS. 11A-11D a full stack 31 is to be disassembled into a first partial stack 32 and a second partial stack 33. The stacking/destacking means 30 is provided with vertically moveable gripping means 34 adapted to grip any selected container in a stack of containers. To destack the second partial stack 33 from the first 32, the gripping means are moved vertically to a suitable position for engaging with the lowermost container of the second partial stack 33. The gripping means 34 then lift the second partial stack 33 so that it is no longer engaged with the first partial stack 32, as seen in FIG. 11B. The conveying means 1 is then operated to move the first partial stack 32 away, as shown in FIG. 11C, and, once the first partial stack 32 is clear, the gripping means 34 lower the second partial stack 33 onto the conveyor 1, as shown in FIG. 11D. In some embodiments this may be done without stopping the conveyor 1.

Where two partial stacks are to be stacked together (not shown) the gripping means are moved to engage the lowermost container of the first partial stack. The gripping means then raise the first partial stack above the height of the second partial stack. The conveyor moves the second partial stack beneath the first partial stack, and the first partial stack is lowered into engagement with the second partial stack.

In some less preferred embodiments a destacking means (not shown) may be substituted for the combined stacking/destacking means 30. In this case (not shown) the first conveying means may be provided with a dedicated stacking means positioned towards the discharge position 4 in order to create full stacks for removal from the first conveying means 1.

In some embodiments (not shown) the gripping means 34 are provided with moving means which allow the gripping means to move horizontally for a distance equal to the width of a stack, in order to allow the stack assembly/disassembly means to be used to transfer containers from the container store dispatch conveyor 28 to the first conveying means 1. However, in other embodiments an alternative transfer means may be used.

Figure 14:
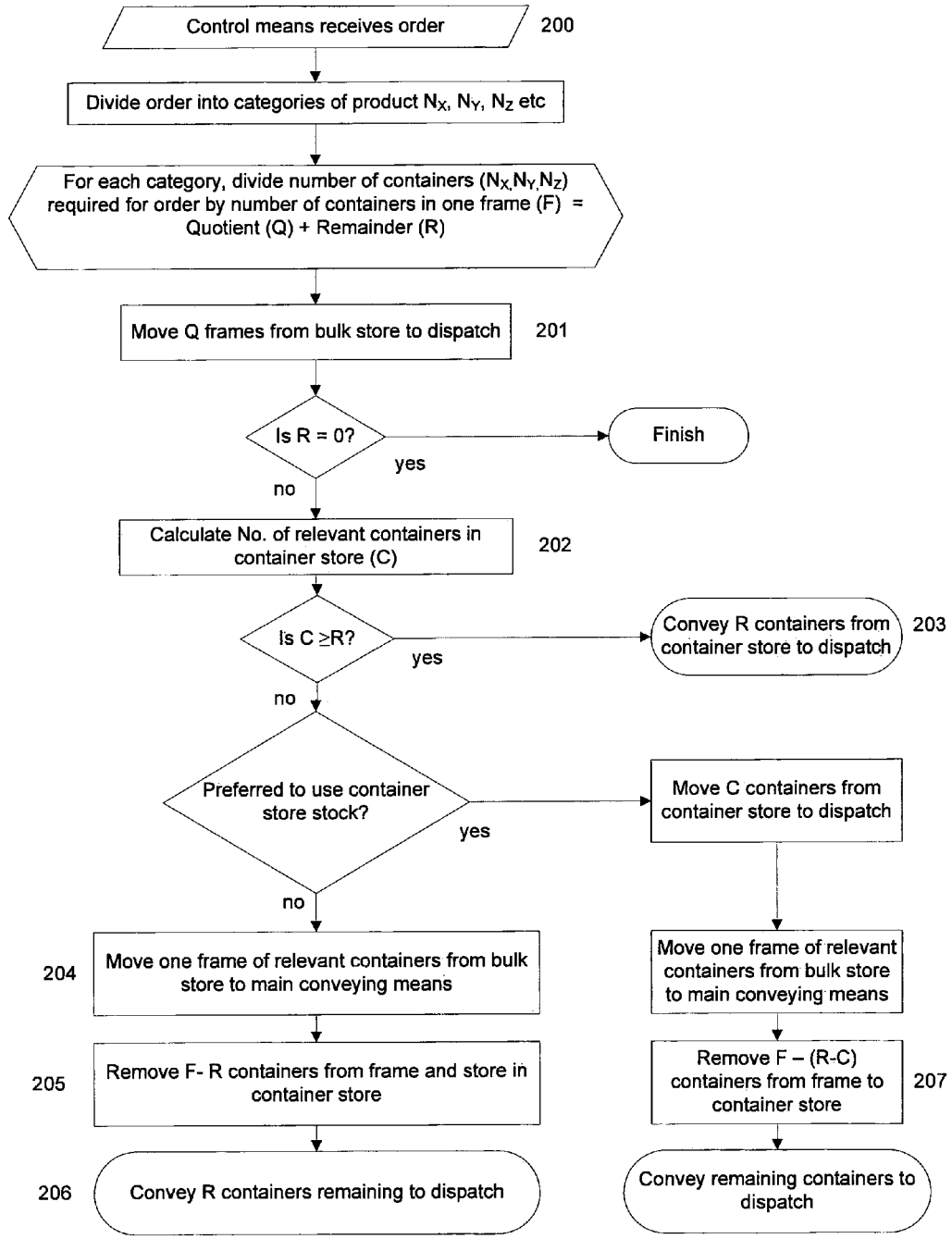
FIG. 14: Is a flow chart showing an algorithm used by the control means to fulfill an order.

Referring next to FIG. 14, in one embodiment the operation of the system is as follows:

The control means 10 receives an order 200 for a required number $N_X$ of containers containing a certain item X, and a required number $N_Y$ of containers of a different item Y. If both $N_X$ and $N_Y$ are equal to or divisible by the number of containers in a frame of containers then the control system sends a signal which is interpreted as a request for the requisite number of whole frames of each product to be loaded from a bulk storage area 11 onto the loading position 2 of the first conveying means 1, for example by a forklift. The signal may be any suitable signal, for example it be used to prompt an operator via a display device, or to activate a materials handling device in a more highly automated system. The first conveying means 1 then moves the frame of containers to the discharge position 4 where the containers are collected and dispatched 201. In an alternative embodiment the control means may direct that the frame be dispatched directly from the bulk storage area 11, bypassing the first conveying means 1.

If either $N_X$ or $N_Y$ is less than a full frame, or if there remain crates to be supplied for the order once the requisite number of full frames of X or Y have been supplied, then the system may review its record of the containers resident in the container store 202. If the required number of containers of the relevant type are present in the container store 5 then the control means may identify which row 6 the containers reside in and may operate a moveable container store conveying means to transfer the required number of containers from the relevant row to the main discharge conveyor 203.

In the embodiment shown in FIG. 10 the crate robot 9 is provided with a moveable conveying means, which functions as both a container loading means and a container retrieving means. In this embodiment the crate robot 9 is not provided with gripping means. The moveable conveying means is substantially aligned with the rows and is moveable up and down the aisle so as to index with any of the rows, the container store delivery conveyor 26 or the container store dispatch conveyor 28 as required.

The crate robot 9 transfers stacks of containers, starting with the stack of the appropriate variety of container which is nearest to the discharge conveyor, and then working towards the stack most far away, until stacks holding the required number of containers have been supplied.

If it is determined that the last stack to be removed from the container store is not needed in its entirety, then the control means may direct the stacking/destacking means 30 to break the stack into a first partial stack having sufficient containers to allow the order to be fulfilled, and a second partial stack consisting of the remainder. The remainder partial stack may then be transferred to the container store delivery conveyor 26 and returned to the container store 5.

If the number of the relevant variety of containers resident in the container store 5 is insufficient to make up the order then the control means 10 may send a request 204 for a full frame to be delivered to the loading position 2.

The control means 10 may then operate the container store delivery conveyor 26, crate robot 9, and the stacking destacking means 30 (if required) to remove the containers not required to fulfill the order from this frame on the first conveying means 1, and store them 205 in the container store 5, thereby replenishing the container store. The remainder of the containers from the frame which are on the main conveyor 1 travel to discharge position 4, where they are picked up and dispatched 206.

Alternatively the control means 10 may operate the conveyors 26, 28 and container storage/retrieval means to transfer some number of containers from the store to the first conveying means 1, for example part of a stack in the location closest to the first conveying means 1, and may remove from the full frame just delivered the number of containers which are in excess of that required to fulfill the order from the first conveying means, together with a number equal to that transferred from the store 207. This may be done when certain conditions specified by a particular user are met, for example it is preferred to have containers present in the container store dispatched before containers in the replacement frame are dispatched (for example with containers containing perishable goods), or where the replacement frame is from a different batch of goods to those which are present in the container store.

By separating the mechanism which performs the stack assembly/disassembly function from that which performs the container store retrieving/loading function; the time taken to process an order is reduced.

As will be appreciated, the control means 10 may be concentrated into a single controller or distributed around a site (eg a warehouse) or multiple sites, as required. Known communication means may be used to exchange information between distributed controllers.

It will be apparent to those skilled in the art how to realise control means, in software and/or hardware, for performing the desired functionality based on the disclosure provided herein.

Known identification and/or tracking or quantification means may be used to identify a particular item or group of items and monitor its position within the system, as well as entry and exit therefrom.

Referring next to FIG. 12 in a further embodiment 109 the system, which is a variation of the system shown in FIGS. 10 and 11, may be provided with a full stack delivery conveyor 39 that is closer to the loading position 2 than the container store dispatch conveyor 28 is.

A remainder conveyor 37 is provided which transports partial stacks left over when a full stack is taken from the container store 6 or is moved along the first conveying means 1, but is not required in its entirety. The remainder conveyor 37 transports the remainder partial stack to the container store 5.

The full stack delivery conveyor 39 is preferably closer to the loading position 2 than the container store dispatch conveyor 28. The full stack delivery conveyor 39 delivers full stacks to the container store 5 for pick up by the crate robot (not shown), without the need for the full stacks to be processed through a combined stacking/destacking means 30. A suitable transfer means transfers the full stacks from the main conveying means 1 to the full stack delivery conveyor 39. The transfer means may include pushers, transfer spurs, pop-up sections of conveyor, a suitable index conveyor or an automated crane.

The system 109 is otherwise the same as that shown in FIG. 10. The stacking/destacking means 30 may be essentially the same as the destacking/destacking means 30 shown in FIGS. 11A-11D.

Referring next to FIG. 13, in a further variation of the system shown in FIGS. 10 and 11, the system may be provided with a full stack delivery conveyor 39 and a partial stack storage conveyor loop 41. In the embodiment shown the partial stack storage conveyor loop 41 consists of a first partial stack storage conveyor 42, which moves containers away from the first conveying means 1, and a second partial stack storage conveyor 43, which moves containers back to the first conveying means 1, although other configurations of one or more conveyors may be used. Suitable transfer means are provided to transfer stacks from the first partial stack storage conveyor 42 to the second partial stack storage conveyor 43 at the end furthest from the first conveying means.

Partial stacks are created when the combined stacking/destacking means 30 separates a full stack into a first partial stack, which is required to fulfill an order, and a remainder partial stack, which is to be stored for future use.

If the remainder partial stack is made up of containers which are not frequently required then the control means may determine that the partial stack should be stored in the container store 5, as has been described above. However, if the remainder partial stack is made up of containers of a type which are commonly required to fulfill an order, for example containers which are of one of the ten most frequently ordered types, and/or containers which are in the top ten types by number of containers ordered, then the control means may determine that the remainder partial stack should be stored on the partial stack storage conveyor loop 41. Containers on the partial stack storage conveyor loop 41 move around the loop as required so that the containers that are to be picked as part of an order are made available for picking at the stacking/destacking means 30, or, if the entire partial stack is to be picked, to be simply dispatched down the first conveying means 1 rather than transferred back to the first partial stack storage conveyor 42.

The first conveying means 1 preferably forms part of the partial stack storage conveyor loop 41. In a preferred embodiment the combined stacking/destacking means 30 is provided at the intersection of the second partial stack storage conveyor 43 and the main conveying means 1, and is able to retain a first partial stack in order to stack it on top of a second partial stack, to thereby make a larger stack, or wherever possible, a full stack.

The partial stack storage conveyor loop 41 is preferably provided between the container store dispatch conveyor 28 and the container store delivery conveyor 26, with the second partial stack storage conveyor 43 being closer to the loading position 2 than the first partial stack storage conveyor 42 is. Providing a partial stack storage conveyor loop 41 reduces the work done by the crate robot 9 in putting away and retrieving partial stacks of frequently ordered and/or high volume products.

In each of the embodiments described above the main conveying means may be divided into a plurality of separate conveying means, each provided with at least one container store. The plurality of main conveying means may converge to a single conveying means at the loading position and/or the discharge position. In a preferred embodiment multiple main conveying means are used, each having a separate loading position and a shared discharge position, so that the plurality of container stores may be operated in parallel while still providing a single point from which stacks or frames are dispatched.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

Where in the foregoing description, reference has been made to specific components or integers of the invention having known equivalents, then such equivalents are herein incorporated as if individually set forth.

Although this invention has been described by way of example and with reference to possible embodiments thereof, it is to be understood that modifications or improvements may be made thereto without departing from the spirit or scope of the invention.

The invention claimed is:

1. A system for storing and retrieving containers, the system comprising:
    a first conveyor for moving stacks of containers between a loading position and a discharge position;
    a container storage area; a container store dispatch conveyor; a container store delivery conveyor;
    first transfer means for transferring containers from the container store dispatch conveyor to the first conveyor;
    a container transporter for moving containers from the container storage area to the container store dispatch conveyor and from the container store delivery conveyor to the container storage area; and
    stack destacking means positioned between an intersection of the container store dispatch conveyor and the first conveyor and an intersection of the container store delivery conveyor and the first conveyor, or at the intersection of the container store dispatch conveyor and the first conveyor, the stack destacking means operable to destack stacks of containers placed on the first conveyor, the stack destacking means comprising a vertically moving gripping means, wherein the vertically moving gripping means is adapted to destack full stacks into at least two partial stacks by lifting at least one container off of a stack of containers, the stack destacking means positioned to allow containers which have been destacked by the destacking means to be delivered to the container storage area by the container store delivery conveyor wherein the intersection of the container store dispatch conveyor and the first conveyor is closer to the loading position than the intersection of the container store delivery conveyor and the first conveyor.

2. The system of claim 1 wherein the stack destacking means is a combined stacking/destacking means.

3. The system of claim 1 wherein the stack destacking means is positioned to receive containers dispatched from the container storage area by the container store dispatch conveyor.

4. The system of claim 1 provided with a second stack destacking means positioned to receive containers dispatched from the container storage area by the container store dispatch conveyor.

5. The system of claim 1 further comprising a full stack delivery conveyor adapted to transport full stacks of containers from the first conveyor to the container storage area.

6. The system of claim 1 further comprising a partial stack storage conveyor loop adapted to transport selected partial stacks away from the destacking means and then back to the destacking means, without handling by the container store storage/retrieval means.

7. The system of claim 6 wherein the partial stack storage conveyor loop includes a first partial stack storage conveyor and a second partial stack storage conveyor.

8. The system of claim 1 wherein the container transporter includes a crate robot.

9. The system of claim 8 wherein the crate robot is provided with a platform adapted to support at least one stack.

10. The system of claim 8 wherein the crate robot is provided with a second conveyor.

11. The system of claim 8, wherein the crate robot is adapted to engage and transport a plurality of stacks at once.

12. The system of claim 8 wherein the container store dispatch conveyor is adapted to support at least as many stacks as the crate robot.

13. The system of claim 8 wherein the container store includes a plurality of rows of containers arranged in a first rank of rows.

14. The system of claim 13 wherein the container store includes a plurality of rows of containers arranged in a second rank of rows.

15. The system of claim 14 wherein the first rank is substantially parallel to the first conveyor.

16. The system of claim 14 wherein the second rank is substantially parallel to the first conveyor.

17. The system of claim 14, wherein first rank and second rank are spaced apart to create an aisle therebetween.

18. The system of claim 17 wherein the crate robot is moveable along the aisle.

19. The system of claim 1 wherein the containers are stored in the container storage area in rows of stacks, each row having a predetermined maximum number of stacks.

20. The system of claim 19 wherein a crate robot is adapted to engage and transport a number of stacks at once, the number being equal to or greater than the predetermined number of stacks.

21. The system of claim 19 wherein the crate robot is adapted to support at least a full frame of stacks.

\* \* \* \* \*